United States Patent [19]

Fujita

[11] Patent Number: 4,931,517

[45] Date of Patent: Jun. 5, 1990

[54] POLYMERIZATION OF ETHYLENE

[75] Inventor: Takashi Fujita, Yokkaichi, Japan

[73] Assignee: Mitsubishi Petrochemical Company Limited, Tokyo, Japan

[21] Appl. No.: 231,400

[22] Filed: Aug. 12, 1988

[30] Foreign Application Priority Data

Aug. 14, 1987 [JP] Japan ................. 62-202850

[51] Int. Cl.$^5$ .................... C08F 4/66; C08F 10/02
[52] U.S. Cl. ................... 526/128; 502/117; 502/127; 526/160; 526/348.5; 526/348.6; 526/352
[58] Field of Search ................. 526/128, 160

[56] References Cited

U.S. PATENT DOCUMENTS

| | | | |
|---|---|---|---|
| 3,242,099 | 3/1966 | Manyik et al. | 526/153 |
| 3,271,376 | 9/1966 | Achon et al. | 526/128 |
| 4,451,688 | 5/1984 | Kuroda et al. | 526/128 |
| 4,542,199 | 9/1985 | Kaminsky et al. | 526/160 |

FOREIGN PATENT DOCUMENTS

| | | |
|---|---|---|
| 129368 | 12/1984 | European Pat. Off. |
| 0196585 | 10/1986 | European Pat. Off. |
| 51-41676 | 11/1976 | Japan |
| 8703887 | 7/1987 | World Int. Prop. O. |

OTHER PUBLICATIONS

Chemical Abstracts, vol. 68, No. 10, 1968, p. 3935, No 40310m, Columbus, Ohio, US; & JP-A-22 058 ('67) (Keiichi Azuma, Kazuo Shikata, and Kaiji Yokokawa), 30-10-1964.

Primary Examiner—Edward J. Smith
Attorney, Agent, or Firm—Oblon, Spivak, McClelland, Maier & Neustadt

[57] ABSTRACT

A process for the polymerization of ethylene comprises bringing ethylene or ethylene and at least one α-olefin in contact with a catalyst comprising a metallocene compound of a transition metal selected from Groups IVB, VB and VIB, an aluminoxane and a silicon compound having an Si-O-C bond for polymerization. The use of the silicon compound having an Si-O-C bond in the catalysis by a combination of a metallocene compound and an aluminoxane results in the production of ethylene polymers having a lower melt flow rate (MFR) than those produced similarly except for the silicon compound not being used.

10 Claims, No Drawings

POLYMERIZATION OF ETHYLENE

BACKGROUND OF THE INVENTION

1. Field of the Invention

The present invention relates to a process for the polymerization of ethylene.

More specifically, the present invention is concerned with a process for the production of ethylene polymers having a melt flow rate (hereinafter abbreviated as MFR) controlled to a low value, which is primarily characterized in the catalyst to be used.

2. Statement of the Prior Art

The greatest problem with the process for producing polyethylene is the removal of heat, because the polymerization of ethylene is an exothermic reaction. Polymerization of ethylene at a higher temperature results in an increase in the efficiency of removal of heat, since there may be a larger difference in temperature between the temperature of the polymerization mass and the temperature of the coolant due to the elevated reaction temperature.

Polyethylene is generally used in the form of pellets. However, suspension polymerization and gas-phase polymerization give powdery polyethylenes, which have to be pelletized through melting. If such polymerization is carried out at a higher temperature, for instance, a temperature higher than the melting point of a polymer product, it would be very advantageous in view of energy, since as-molten polyethylene can be introduced directly into an extruder for pelletizing.

On the other hand, a problem with the application of higher temperatures to polymerization is that it may not be possible to obtain polymer products having a melt flow rate or index (MFR) reduced to a sufficiently low region, since the chain transfer rate is increased more remarkably than the growth rate of ethylene at such higher temperatures. This means that further difficulty is encountered in reducing the MFR of copolymers of ethylene with α-olefins due to the fact that the chain transfer rate of α-olefins is increased over that of ethylene.

The point as discussed above places an upper limit on the polymerization reaction temperature in view of the desired MFR of polymers, and further, leads to some limitation being imposed upon the degree of conversion of polymers. Thus, of vital importance is the development of catalysts capable of attaining a wide range of MFR's or lower MFR's over a sufficiently high temperature range.

As means for providing a solution to such problems, Japanese Patent Laid-Open Publication Nos. 59(1984)-14 5206, 61(1986)-204204, 61(1986)-207405, 61(1986)-276803 and 62(1987)-84107 have proposed catalysts comprising combinations of a solid catalyst component containing at least titanium, magnesium and a halogen as the transition metal component; an organoaluminium compound serving as an organic metal component; and a third component to be added at the time of polymerization.

In addition to such catalysts, those comprising a metallocene compound of a transition metal and an aluminoxane have recently been proposed as new catalysts for the polymerization of olefins (Japanese Patent Laid-Open Publication Nos. 58(1983)-19309, 60(1985)-35006, 60(1985)-35007, 60(1985)-35008, 60(1985)-130604, 60(1985)-217209, 60(1985)-245604, 60(1985)-245605, 61(1986)-31404, 61(1986)-130314 and 61(1986)-276805).

These catalysts are homogeneous polymerization catalysts, while conventional catalysts such as those based on titanium trichloride and titanium-on-magnesium are non-homogeneous polymerization catalysts. For that reason, when the copolymerization of ethylene with α-olefins is carried out with such homogeneous polymerization catalysts, there is an advantage that the obtained polymers differ in copolymerizability from ethylene copolymers prepared with the conventional non-homogeneous polymerization catalysts.

It has now been found, however, that when polymerization is carried out at a further elevated temperature with the above homogeneous polymerization catalysts, there is a problem that the MFR of polymer products is increased to an unacceptable degree.

SUMMARY OF THE INVENTION

The present invention provides a process for the polymerization of ethylene characterized in that ethylene or ethylene and at least one u-olefin is or are brought into contact with a catalyst comprising a combination of the following components (A), (B) and (C) for polymerization.

Component (A):

A metallocene compound of a transition metal selected from Groups IVB, VB and VIB of the Periodic Table;

Component (B):

An aluminoxane; and

Component (C):

A silicon compound having an Si—O—C bond.

According to the present invention, it is possible to produce polymers having their MFR's reduced considerably and controlled to a desired value over a wide range from normal low to relatively high polymerization temperatures inclusive of a temperature higher than the melting point of the polymer products. In particular, the present invention has a striking effect upon decreases in the MFR of ethylene polymers obtained by polymerization at a temperature higher than the melting point of the polymer products.

This means that when formed into films, the ethylene polymers obtained according to the process of the present invention are improved in terms of blocking resistance and transparency, etc., since they have a reduced or limited content of low-molecular weight or low-crystalline wax products.

The ethylene copolymers obtained according to the process of the present invention also excel extremely in random copolymerizability. For that reason, an ethylene copolymer obtained by the process of the present invention and having a density of, e.g., 0.85 to 0.94 g/cm$^3$ is found to have one or more melting points not reaching 120° C., as determined by the melting point measurement according to the DSC method, and have a Q value, an index to a molecular-weight distribution, of no higher than 3.2.

Furthermore, the process of the present invention eliminates operational troubles such as clogging of pipes in the apparatus by catalyst particles and problems such as degradation of polymer products due to fluctuations in the polymerization temperatures, because the catalyst components are in a homogeneous state at the time of polymerization.

DETAILED DESCRIPTION OF THE INVENTION

CATALYSTS

The catalysts used in the present invention comprise a combination of the components (A), (B) and (C) to be described later, and can contain a fourth component within the scope purported by the present invention.

Component (A)

The component (A) used in the present invention is a metallocene compound of a transition metal selected from Groups IVB, VB and VIB of the Periodic Table. To this end, use may be made of known metallocene compounds described in, for instance, Japanese Patent Laid-Open Publication Nos. 58(1983)-19309, 60(1985)-35006, 60(1985)-35007, 60(1985)-35008, 60(1985)-130604, 60(1985)-217209, 60(1985)-245604, 60(1980)-245605, 61(1986)-31404, 61(1986)-130314 and 61(1986)-276805.

Preferable metallocene compounds to be used in the present invention have the following formula (1).

$(CpR_m)_a R'_b (CpR_m) MX_{c-(a+1)}$ (1)

wherein the moiety $(CpR_m)$ represents cycropentadienyl or a substituted cyclopentadienyl group in which each of R which may be the same or different is hydrogen atom, a monovalent hydrocarbyl group having 1 to 20 carbon atoms such as an alkyl, alkenyl, aryl, alkylaryl or arylalkyl, or a 4- to 6-membered ring sharing two carbon atoms of the cyclopentadienyl moiety Cp; R' is a divalent group which links the groups $(CpR_m)_a$ and $(CpR_m)$ and which is selected from the group consisting of an alkylene group having 1 to 4 carbon atoms, an alkylsilicon having 1 to 4 carbon atoms in each of the alkyl moiety thereof, an alkylgermanium having 1 to 4 carbon atoms in each of the alkyl moiety thereof, an alkylphosphine having 1 to 4 carbon atoms in each of the alkyl moiety thereof, and an alkylamine having 1 to 4 carbon atoms in each of the alkyl moiety thereof; X each of which may be the same or different from each other represents hydrogen atom, a monovalent hydrocarbyl group having 1 to 20 carbon atoms such as an alkyl, alkenyl, aryl, alkylaryl or arylalkyl, or a halogen atom; M represents a transition metal of the Group IVB, VB or VIB of the Periodic Table; c represents a valence of the transition metal M, b is 0 or 1; a is 0, 1 or 2, provided that when a is 0, b is 0, when b is 1, m is 4, and when b is 0, m is 5.

More preferable metallocene compounds are the compounds of the formula (1) where M is Zr, Ti or Hf, a is 1, and at least one of X is the hydrocarbyl group or a chlorine atom or a hydrogen atom.

Most preferable metallocene compounds are the compounds of the formula (1) where M is Zr, a is 1, and at least one of X is the hydrocarbyl group or a chlorine atom.

Examples of such compounds may include zirconocene compounds such as, for instance, bis(cyclopentadienyl)zirconium dichloride, bis(cyclopentadienyl)zirconium methylmonochloride, bis(cyclopentadienyl)zirconium ethylmonochloride, bis(cyclopentadienyl)zirconium isobutylmonochloride, bis(cyclopentadienyl)zirconium dimethyl, bis(cyclopentadienyl)zirconium diethyl, bis(cyclopentadienyl)zirconium diphenyl, bis(cyclopentadienyl)zirconium monochloridehydride, bis(cyclopentadienyl)zirconium methylene, bis(cyclopentadienyl)zirconiummethylhydride, bis(methylcyclopentadienyl)zirconium dichloride, bis(ethylcyclopentadienyl)zirconium dichloride, bis(butylcyclopentadienyl)zirconium dichloride, bis(hexylcyclopentadienyl)zirconium dichloride, bis(octylcyclopentadienyl)zirconium dichloride, bis(dimethylcyclopentadienyl)zirconium dichloride, bis(trimethylcyclopentadienyl)zirconium dichloride, bis(tetramethylcyclopentadienyl)zirconium dichloride, bis(pentamethylcyclopentadienyl)zirconium dichloride, bis(indenyl)zirconium dichloride, bis(anthranyl)zirconium dichloride, ethylenebis(cyclopentadienyl)zirconium dichloride, dimethylsilyldicyclopentadienyl zirconium dichloride, ethylenebis(indenyl)zirconium dichloride, ethylenebis(indenyl)zirconium dimethyl, ethylenebis4,5,6,7-tetrahydro1-indenyl)zirconium dichloride, ethylenebis(4-methyl1-indenyl)zirconium dichloride, ethylenebis(4,7-dimethylindenyl)zirconium dichloride, monocyclopentadienylzirconium trichloride and tris(cyclopentadienyl)zirconium chloride; and hafnocene compounds such as, for instance, bis(cyclopentadienyl) hafnium dichloride, bis(cyclopentadienyl)hafnium methyl monochloride, bis(cyclopentadienyl)hafnium ethyl monochloride, bis(cyclopentadienyl)hafnium isobutyl monochloride, bis(cyclopentadienyl)hafnium dimethyl, bis(cyclopentadienyl)hafnium diethyl, bis(cyclopentadienyl)hafnium diphenyl, bis(cyclopentadienyl)hafnium dibromide, bis(cyclopentadienyl)hafnium methylene, bis(cyclopentadienyl)hafnium methylhydride, bis(methylcyclopentadienyl)hafnium dichloride, bis(ethylcyclohexylpentamethyl)hafnium dichloride, bis(butylcyclopentadienyl)hafnium dichloride, bis(hexylcyclopentadienyl)hafnium dichloride, bis(octylcyclopentadienyl)hafnium dichloride, bis(dimethylcyclopentadienyl)hafnium dichloride, bis(trimethylcyclopentadienyl)hafnium dichloride, bis(tetramethylcyclopentadienyl)hafnium dichloride, bis(pentamethylcyclopentadienyl)hafnium dichloride, bis(indenyl)hafnium dichloride; bis(anthranyl)hafnium dichloride; ethylenebis(cyclopentadienyl)hafnium dichloride; dimethylsilyldicyclopentadienylhafnium dichloride, ethylenebis(indenyl)hafnium dichloride, ethylenebis(4,5,6,7-tetrahydro-1-indenyl)hafnium dichloride, ethylenebis(4-methyl-1-indenyl)hafnium dichloride and ethylenebis(4,7-dimethylindenyl)hafnium dichloride. Additional examples of the metallocene compounds may include bis(cyclopentadienyl)titanium dichloride, bis(cyclopentadienyl)titanium dimethyl, bis(cyclopentadienyl)titanium diphenyl, bis(ethylcyclopentadienyl)titanium dichloride, bis(butylcyclopentadiphenyl)titanium dichloride, bis(indenyl)titanium dichloride, bis4,5,6,7-tetrahydro-1-indenyl)titaniumdichloride and bis(cyclopentadienyl)vanadium dichloride.

Examples of more preferable metallocene compounds are bis(cyclopentadienyl)zirconium dichloride, bis(cyclopentadienyl)zirconium methylchloride, bis(cyclopentadienyl)zirconium monochloridehydride, bis(methylcyclopentadienyl)zirconium dichloride, bis(ethylcyclopentadienyl)zirconium dichloride, bis(butylcyclopentadienyl)zirconium dichloride, bis(pentamethylcyclopentadienyl)zirconium dichloride, bis(indenyl)zirconium dichloride, bis4,5,6,7-tetrahydro-1-indenyl)zirconium dichloride, ethylene bis(cyclopentadienyl)zirconium dichloride, ethylene bis(indenyl)zirconium dichloride, and ethylene bis4,5,6,7-tetrahydro1-indenyl)zirconium dichloride.

Component (B)

The aluminoxanes, which can interchangeably be called "alumoxanes", used as the component (B) may be known ones. Among others, preference is given to a cyclic aluminoxane expressed by the general formula: or a linear aluminoxane expressed by the general formula:

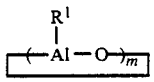

or a linear aluminoxane expressed by the general formula:

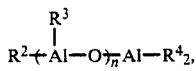

provided that $R^1$, $R^2$, $R^3$ and $R^4$ are independent hydrocarbyl groups each having 1 to 8 carbon atoms, preferably 1 to 4 carbon atoms, most preferably a methyl group, and m and n each stand for a number between 2 and 100, preferably between 3 and 50.

The above aluminoxanes may be prepared by various known methods, which typically involve:

(a) a reaction of a trialkylaluminium directly with water in a suitable organic solvent such as toluene, benzene and ether;

(b) reaction of a trialkylaluminium with a salt hydrate containing water of crystallization such as a hydrate of copper or aluminum sulfate; and (c) reaction of a trialkylaluminium with moisture impregnated in silica gel, etc.

Component (C)

The silicon compounds having an Si—O—C bond, which are usable in the present invention, may be expressed by the following general formula:

$$R^5{}_{4-n}SiY_n$$

wherein $R^5$ is a hydrocarbyl group having 1 to 10 carbon atoms, preferably 1 to 8 carbon atoms, and may be the same or different from each other when 4−n is equal to or larger than 2; Y is $OR^6$ or $OCOR^7$ in which $R^6$ and $R^7$ may be the same or different and is a hydrocarbyl group having 1 to 10 carbon atoms, preferably 1 to 8 carbon atoms; and n is a number where $0 < n \leq 4$ is satisfied.

Of the silicon compounds expressed by the above general formula, preference is given to those wherein Y is $OR^6$ in which $R^6$ is a lower alkyl group having 1 to 4 carbon atoms, and n equals 3 or 4, preferably 4.

More particularly, reference may be made to silicon compounds such as tetramethyl silicate, tetraethyl silicate, tetrapropyl silicate, tetrabutyl silicate, tetraphenyl silicate, tetratolyl silicate, methyltrimethoxysilane, methyltriethoxysilane, methyltributoxysilane, ethyltrimethoxysilane, ethyltriethoxysilane, butyltrimethoxylsilane, norbornyltrimethoxysilane, phenyltrimethoxysilane, phenyltriethoxysilane, phenyltributoxysilane, dimethyldimethoxysilane, dimethyldiethoxysilane, diethyldimethoxysilane, diethyldiethoxysilane, diphenyldimethoxysilane, diphenyldiethoxysilane, diphenyldibutoxysilane, methylethyldimethoxysilane, methyl t-butyl dimethoxy silane, methylphenyldimethoxysilane, trimethylmethoxysilane, trimethylethoxysilane, triphenylmethoxysilane and triphenylethoxysilane.

Ratios of the Components (A) to (C) Used

The quantitative ratio of aluminium in the component (B) with respect to the transition metal in the component (A) is in an atomic (B) to (A) ratio range of 1 to 5000, preferably 5 to 3000, while the amount of the component (C) used is in a range of 0.01 to 1, preferably 0.02 to 0.5, as expressed in terms of the atomic ratio of Si in the component (C) with respect to Al in the component (B) (i.e., the atomic Si to Al ratio).

Polymerization of Ethylene

The polymerization of ethylene practiced with the use of the catalyst system according to the present invention is the homopolymerization of ethylene or the copolymerization of ethylene with at least one o-olefin having the following general formula:

wherein R is a hydrocarbyl group having 1 to 10 carbon atoms.

Examples of the α-olefins having the general formula:

may include propylene, butene-1, pentene-1, hexene-1, 4-methylpentene-1 and octene-1, which can be used in combination.

According to the present invention, the polymerization can be carried out in batchwise fashion, but is generally performed in a continuous manner. Any suitable polymerization apparatus is used such as those used for the production of low-pressure polyethylene by the slurry or gas-phase process and, those generally used for the high-pressure radical polymerization process (see, for instance, Japanese Patent Laid-Open Publication No. 56(1981)-18607).

In the process according to the present invention the polymerization medium used may be an inert solvent or the monomer per se. The inert solvents used may include an aromatic hydrocarbon such as benzene, toluene and xylene and an aliphatic hydrocarbon solvent such as hexane, heptane and n-dodecane, by way of example.

The polymerization pressure, although not critical, may be in a range of 1 to 3,000 kg/cm². A pressure of 1 to 50 kg/cm², preferably 5 to 40 kg/cm² may be applied with an apparatus for the production of low-pressure polyethylene, and a pressure of 200 to 3,000 kg/cm², preferably 500 to 3,000 kg/cm² with an apparatus for the production of high-pressure polyethylene.

In the present invention, the polymerization temperature used may be from room temperature to about 300° C., but preference is given to a temperature of 125° to 300° C. higher than the melting point of polymer products.

Ethylene Polymers Produced

Referring to the densities of the ethylene polymers according to the process of the present invention, the ethylene homopolymers are high density polyethylene having a density of 0.95 to 0.97 g/cm³, while the ethylene copolymers containing up to 20 mol % of an olefin copolymerized have a density ranging from 0.85 g/cm³ to that of the ethylene homopolymers.

The ethylene copolymers obtained according to the process of the present invention also excel extremely in random copolymerizability. For instance, an ethylene copolymer obtained by the process according to the present invention and having a density ranging 0.85 to 0.94 g/cm³ has one or more melting points not reaching 120° C., as determined by the DSC method, and also has a Q value, which is an index to a molecular weight distribution, of no higher than 3.2, preferably 1.5 to 3.2. The DSC method herein used in characterizing the ethylene polymers in accordance with the present invention is a differential scanning calorimetry in accordance with ASTM D 3417 and the Q value is defined by an equation: $Q=M_w/M_N$ where $M_w$ presents a weight-average molecular weight and $M_N$ presents a number-average molecular weight, both determined by a gel permeation chromatography.

The ethylene homopolymers and copolymers produced in accordance with the present invention have a lower melt flow rate, MFR, determined by a method of ASTM D-1238 at 190° C. under load of 2.16 kg than those obtained when no silicon compound of the component (C) is used in the catalyst, which is thus a combination of the components (A) and (B).

Furthermore, the ethylene polymers obtained according to the process of the present invention have a reduced or limited MFR due to the reduced or limited content of the low-molecular weight matters produced, and can be molded into films with improved tackiness.

EXPERIMENTAL EXAMPLES

EXAMPLE 1

In an ethylenic atmosphere, 500 ml of toluene amply dehydrated and deoxygenated and 15 ml of 1-hexene were put in a stainless steel autoclave of 1.5 lit. in volume, the interior temperature of which was then increased to 75° C. Added to this were 0.3 mg, calculated as atomic Zr, of bis(cyclopentadienyl)zirconium dichloride (available from Kanto Kagaku K.K., Japan), 89 mg, calculated as atomic Al, of methylaluminoxane having a degree of polymerization of about 12 (available from Toyo Stauffer K.K., Japan), which was a cyclic aluminoxane of the formula given hereinabove where $R^1$ was methyl and n was ca. 12, and 41.1 mg of tetraethyl silicate dissolved in 50 ml of toluene, and the polymerization was effected at 75° C. for 20 minutes, with the total pressure of ethylene maintained at 9 kg/cm²G. After the completion of the reaction, ethylene was purged, and the reaction product was cooled and 500 ml of ethanol added, followed by filtration and then drying under reduced pressure.

As a result, 15.8 g of polyethylene were obtained, which was found to have an MFR of 1.7 g/10 minutes and a density of 0.938 g/cm³. The catalyst activity was then 52,700 g-PE/g-Zr. The melting points of the copolymer determined by the DSC method was 118.2° C., and the Q value was 2.7.

EXAMPLE 2

Ethylene was polymerized in a similar manner as stated in Example 1, except that 25.1 mg of tetramethyl silicate were used instead of tetraethyl silicate.

As a result, 17.7 g of polyethylene were obtained, which was found to have an MFR of 2.7 g/10 minutes and a density of 0.939 g/cm³. The catalyst activity was then 59,000 g-PE/g-Zr. The melting points (by DSC) were 118.5° C., and the Q value was 2.8.

EXAMPLE 3

In an ethylene atmosphere, 500 ml of amply dehydrated and deoxygenated toluene were put in a stainless steel autoclave of 1.5 lit. in volume, the interior temperature of which was in turn brought up to 130° C. Added to this were 0.3 mg, calculated as atomic Zr, of bis(cyclopentadienyl)zirconium dichloride, 89 mg, calculated as atomic Al, of methylaluminoxane having a degree of polymerization of ca. 12 (available from Toyo Stauffer K. K., Japan), which was a cyclic aluminoxane of the formula given hereinbefore where $R^1$ was methyl and n was ca. 12, and 41.1 mg of tetraethyl silicate dissolved in 50 ml of toluene, and ethylene was fed thereto at 130° C. for 20-minute polymerization in which the total pressure of ethylene was kept at 9 kg/cm². After the completion of the reaction, ethylene was purged, and the reaction product was cooled and 500 ml of ethanol added followed by filtration and drying under reduced pressure.

As a result, 12.9 g of polyethylene were obtained, which was found to have an MFR of 6.8 g/10 minutes. The catalyst activity was then 43,100 g-PE/g-Zr.

COMPARATIVE EXAMPLE 1

Ethylene was polymerized in a similar manner as stated in Example 3, except that tetraethyl silicate was not used.

The results obtained are set forth in Table 1.

EXAMPLE 4

Experimentation was carried out in a similar manner as stated in Example 3, except that the polymerization was effected with the addition of 15 ml of 1-hexene.

The results obtained are set forth in Table 1.

EXAMPLES 5 to 8 and COMPARATIVE EXAMPLE 2

Experiments were performed in a similar manner as described in Example 4, except that the silicon compounds specified in Table 1 were used for tetraethyl silicate.

The results are given in Table 1.

TABLE 1

| | Transition metals | Aluminoxane | Silicon compounds | Al/Zr (atomic) | Si/Al (Atomic) | 1-Hexene used (ml) | Catalyst Activity (g-PE/g-Zr) | MFR (g/10 min.) | Density (g/cm³) |
|---|---|---|---|---|---|---|---|---|---|
| Exam. 3 | Bis(cyclopentadienyl)zirconium dichloride | Methyl aluminoxane | Tetraethyl Silicate | 1000 | 0.06 | 0 | 43,100 | 6.8 | — |
| Comp. Exam. 1 | Bis(cyclopentadienyl)zirconium dichloride | Methyl aluminoxane | — | " | 0 | 0 | 102,000 | 130 | — |
| Exam. 4 | Bis(cyclopenta- | Methyl | Tetraethyl | " | 0.06 | 15 | 45,200 | 9.2 | 0.935 |

TABLE 1-continued

| | Transition metals | Aluminoxane | Silicon compounds | Al/Zr (atomic) | Si/Al (Atomic) | 1-Hexene used (ml) | Catalyst Activity (g-PE/g-Zr) | MFR (g/10 min.) | Density (g/cm$^3$) |
|---|---|---|---|---|---|---|---|---|---|
| | dienyl)zirconium dichloride | aluminoxane | Silicate | | | | | | |
| Exam. 5 | Bis(cyclopentadienyl)zirconium dichloride | Methyl aluminoxane | Tetramethyl Silicate | " | 0.05 | 15 | 46,800 | 10.2 | 0.936 |
| Exam. 6 | Bis(cyclopentadienyl)zirconium dichloride | Methyl aluminoxane | Phenyltrimethoxysilane | " | 0.04 | 15 | 49,600 | 24.3 | 0.937 |
| Exam. 7 | Bis(cyclopentadienyl)zirconium dichloride | Methyl aluminoxane | t-butylmethyl-dimethoxysilane | " | 0.05 | 15 | 61,400 | 58 | 0.936 |
| Exam. 8 | Bis(cyclopentadienyl)zirconium dichloride | Methyl aluminoxane | Triphenylmethoxysilane | " | 0.05 | 15 | 53,300 | 83 | 0.939 |
| Comp. Exam. 2 | Bis(cyclopentadienyl)zirconium dichloride | Methyl aluminoxane | — | " | 0 | 15 | 121,700 | 220 | 0.941 |

EXAMPLE 9

Experimentation was carried out in a manner similar to that described in Example 4, except that bis(indenyl)-zirconium dichloride was used in an amount of 0.6 mg calculated as atomic Zr in place of bis(cyclopentadienyl)zirconium chloride.

The results obtained are summarized in Table 2.

COMPARATIVE EXAMPLE 3

Experimentation was conducted in a manner similar to that stated in Example 9, except that tetraethyl silicate was not used.

The results are set out in Table 2.

TABLE 2

| | Silicon compounds | Al/Zr ratio (atomic) | Si/Al ratio (Atomic) | Catalyst Activity (g-PE/g-Zr) | MFR (g/10 min.) | Density (g/cm$^3$) |
|---|---|---|---|---|---|---|
| Exam. 9 | Tetraethyl Silicate | 500 | 0.06 | 16,800 | 23 | 0.936 |
| Comp. Exam. 3 | — | 500 | 0 | 28,700 | 180 | 0.943 |

EXAMPLE 10

Preparation of Catalyst

At room temperature, 20 lit. of amply dehydrated and deoxygenated toluene were charged in an autoclave of 30 lit. in volume, which had been amply replaced therein with nitrogen and provided with an agitator, and added to this were 1.0 g of bis(cyclopentadienyl)zirconium dichloride, 46.2 g, calculated as atomic Al, of methyl aluminoxane having a degree of polymerization of ca. 12 (available from Toyo Stauffer K.K., Japan) and 17.8 g of tetraethyl silicate to prepare a catalyst solution.

Copolymerization of Ethylene

Eight point two (8.2) kg/hour of ethylene and 11,000 lit. of 1-butene were fed into an autoclave type continuous reactor of 1.5 lit. with the internal volume at a total pressure of 2,000 kg/cm$^2$ and a polymerization temperature of 170° C. Continuously supplied to this was the above catalyst solution at a controlled temperature of 170° C. for the copolymerization of ethylene.

The resulting polymer was found to have an MFR of 8.8 g/10 minutes, an FR of 5.8 and a density of 0.905 g/cm$^3$. The catalyst activity was then 115,000 g-PE/g-Zr. The FR is defined by an equation:

$$FR = \frac{MFR \text{ under load of 10 kg}}{MFR \text{ under load of 2.16 kg}}$$

This ethylene copolymer was also found to have melting points of 79.0° and 92.5° C., as measured by the DSC method, and a Q value of 2.8.

EXAMPLE 11

Ethylene and 1-hexene were admitted into the same arrangement as used in Example 10 at the respective rates of 10.0 kg/hour and 44.0 lit./hour and at a total pressure of 2,000 kg/cm$^2$ and a polymerization temperature of 170° C. Continuously supplied to this was the catalyst solution prepared in Example 10 at a controlled pressure of 170° C. for the copolymer of ethylene.

The resulting ethylene copolymer was found to have an MFR of 1.6 g/10 minutes, an FR of 5.6 and a density of 0.918 g/cm$^3$. The catalyst activity was then 142,000 g-PE/g-Zr.

This ethylene copolymer was also found to have a melting point of 111.2° C., as measured by the DSC method, and a Q value of 2.9.

What is claimed is:

1. A process for polymerizing ethylene alone or in combination with an α-olefin, which comprises:
   contacting ethylene or said ethylene α-olefin combination with a catalyst at a room temperature ranging from 125°–300° C. under a pressure of from 1–3000 kg/cm$^2$ for the production of low-pressure polymer material or at a pressure ranging from 200–3000 kg/cm$^2$ for the preparation of high-pressure polymer material, said catalyst comprising the combination of:
   (A) a metallocene compound of the formula:

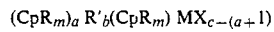   (1)

$(CpR_m)_a R'_b(CpR_m) MX_{c-(a+1)}$ wherein the moiety (CPR$_m$) represents cyclopentadienyl or a substituted cyclopentadienyl group in which each R, which may be the same or different, is hydrogen, a monovalent hydrocarbyl group having 1 to 20 carbon atoms or a 4- to 6-membered ring sharing two carbon atoms of the cyclopentadienyl moiety Cp; R' is a divalent group which links the groups (CpR$_m$)$_a$ and (CpR$_m$) and which is selected from the group consisting of an alkylene group having 1 to 4 carbon atoms, an alkylsilicon having 1 to 4 carbon atoms in each of the alkyl moieties thereof, an alkylgermanium having 1 to 4 carbon atoms in each of the alkyl moieties thereof, an alkylphosphine having 1 to 4 carbon atoms in each of the alkyl moieties thereof, and an alkylamine having 1 to 4 carbon atoms in each of the alkyl moieties thereof; X, each of which may be the same or different from each other, represents hydrogen, a monovalent hydrocarbyl group having 1 to 20 carbon atoms or a halogen atom; M represents a transition metal of the Group IVB, VB or VIB of the Periodic Table; c represents a valence of the transition metal M, b is 0 or 1; a is 0, 1 or 2, provided that when a is 0, b is 0, when b is 1, m is 4, and b is 0, m is 5;

(B) an aluminoxane of the formula:

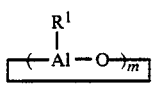

where R$^1$ represents a hydrocarbyl group having 1 to 8 carbon atoms and m represents an integer of 2 to 100 or of the formula:

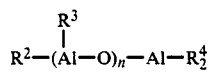

where R$^2$, R$^3$ and R$^4$ each represent a hydrocarbyl group having 1 to 8 carbon atoms and n represents a number of from 2 to 100; and (C) a silicon compound containing an Si—O—C bond of the formula:

wherein R$^5$ represents a hydrocarbyl group having 1 to 10 carbon atoms, Y represents a group OR$^6$ or OCOR$^7$ where R$^6$ and R$^7$, which are the same or different from R$^5$, each represent a hydrocarbyl group having 1 to 10 carbon atoms, and n, is a number satisfying the expression $0 < n \leq 4$, R$^5$'s, when $4-n$ is 2 or larger, being the same or different from each other, thereby producing a polymer of ethylene or ethylene and said α-olefin which has an MFR value lower than that which would be obtained if catalyst component (C) is not present in the catalyst; the ratio of component (B) to component (A) ranging from 1 to 5000, based on the ratio of aluminum in component (B) to the transition metal component of component (A), and the amount of component (C) in the catalyst ranging from 0.01-1 as expressed in terms of the atomic ratio of Si in component (C) to Al in component (B).

2. The process as claimed in claim 1 wherein the metallocene compound is represented by the formula (1) where M is Zr, Ti or Hf, is a 1, and at least one of X is the hydrocarbyl group or a chlorine atom or a hydrogen atom.

3. The process as claimed in claim 1 wherein the metallocene compound is represented by the formula (1) where M is Zr, is 1, and at least one of X is the hydrocarbyl group or a chlorine atom.

4. The process as claimed in claim 1 wherein the metallocene compound is selected from the group consisting of bis(cyclopentadienyl)zirconium dichloride, bis(cyclopentadienyl)zirconium methylchloride, bis(cyclopentadienyl)zirconium monochloridehydride, bis(-methylcyclopentadienyl)zirconium dichloride, bis(ethylcyclopentadienyl)zirconium dichloride, bis(butylcyclopentadienyl)zirconium dichloride, bis(pentamethylcyclopentadienyl)zirconium dichloride, bis(indenyl)zirconium dichloride, bis4,5,6,7-tetrahydro-1-indenyl) zirconium dichloride , ethylene bis(cyclopentadienyl)zirconium dichloride, ethylene bis(indenyl)zirconium dichloride, and ethylene bis4,5,6,7-tetrahydro1-indenyl)zirconium dichloride.

5. The process as claimed in claim 1 wherein R$^1$, R$^2$, R$^3$ and R$^4$ each represent a lower alkyl.

6. The process as claimed in claim 5 wherein R$^1$, R$^2$ R$^3$ and R$^4$ each represent methyl.

7. The process as claimed in claim 1 wherein m and n are each a number of 2 to 50.

8. The process as claimed in claim 1 wherein Y is OR$^6$, R$^6$ being a lower alkyl having 1 to 4 carbon atoms, and n is a number selected from the group of 3 and 4.

9. The process as claimed in claimed 8 wherein n is 4.

10. The process as claimed in claim 1 wherein the process is for producing an ethylene copolymer having an α-olefin copolymerized therein in a content of up to 20 mol % of the copolymer, which ethylene copolymer has (1) a density of from 0.85 to 0.94 g/cm$^3$, (2) a melting point or melting points not reaching 120° C. determined by a differential scanning calorimetry in accordance with ASTM D3417, and (3) a Q value of no higher than 3.2, the Q value being defined by an equation: $Q = M_w/M_x$ where M$_w$ and M$_N$ respectively mean a weight-average molecular weight and a number-average molecular weight both determined by gel permeation chromatography.

* * * * *